United States Patent [19]

Narishige et al.

[11] Patent Number: 4,626,947
[45] Date of Patent: Dec. 2, 1986

[54] THIN FILM MAGNETIC HEAD

[75] Inventors: Shinji Narishige, Mito; Tsuneo Yoshinari, Hitachi; Mituo Sato, Takahagi; Masayuki Takagi; Sadanori Nagaike, both of Odawara; Toshihiro Yoshida, Fujisawa; Katsuya Mitsuoka, Hitachi, all of Japan

[73] Assignee: Computer Basic Technology Research Association, Tokyo, Japan

[21] Appl. No.: 460,658

[22] Filed: Jan. 24, 1983

[30] Foreign Application Priority Data

Oct. 15, 1982 [JP] Japan ............................ 57-179711

[51] Int. Cl.⁴ .................... G11B 5/147; G11B 5/127; G11B 5/187
[52] U.S. Cl. .................................. 360/126; 360/125; 360/122
[58] Field of Search ............... 360/126, 125, 123, 113, 360/122, 127, 119, 120; 336/218; 148/31.55, 426; 420/459

[56] References Cited

U.S. PATENT DOCUMENTS

| | | | |
|---|---|---|---|
| 3,303,117 | 2/1967 | Flur | 204/192 |
| 3,519,498 | 7/1970 | Ahn | 148/31.55 |
| 3,533,860 | 10/1970 | Kench et al. | 148/31.55 |
| 3,549,428 | 12/1970 | Lommel | 148/31.55 |
| 4,102,756 | 7/1978 | Castellani et al. | 204/43 T |
| 4,190,872 | 2/1980 | Jones et al. | 360/125 |
| 4,242,710 | 12/1980 | Hempstead et al. | 360/113 |
| 4,246,619 | 1/1981 | Hirai et al. | 360/125 |
| 4,295,173 | 10/1981 | Romankiw et al. | 360/125 |
| 4,316,228 | 2/1982 | Fujiwara et al. | 360/127 |
| 4,441,940 | 4/1984 | Pfeifer et al. | 148/121 |
| 4,511,942 | 4/1985 | Valstyn | 360/126 |

Primary Examiner—Stuart N. Hecker
Assistant Examiner—Benjamin E. Urcia
Attorney, Agent, or Firm—Antonelli, Terry & Wands

[57] ABSTRACT

A thin film magnetic head comprises a lower magnetic member and an upper magnetic film which constitute a magnetic circuit having a magnetic gap at a predetermined location, and a conductor film forming a coil which intersects the magnetic circuit. At least the upper magnetic film has a magnetostriction constant which is not greater than $6 \times 10^{-7}$ in the absolute value.

2 Claims, 4 Drawing Figures

THIN FILM MAGNETIC HEAD

BACKGROUND OF THE INVENTION

The present invention generally relates to a thin film magnetic head and in particular concerns a thin film magnetic head of magnetic induction type which is adapted for use in magnetic drums, magnetic tapes or magnetic discs for electronic computer systems.

The thin film magnetic head of the magnetic induction type (hereinafter simply referred to as the thin film magnetic head) is realized with the aid of the thin film technology and so designed as to attain a high recording density in the magnetic recording on a magnetic drum, a magnetic tape or a magnetic disc. To this end, the thin film magnetic head includes in a laminated structure a lower or underlying magnetic film and an upper or overlying magnetic film which cooperate together to constitute a magnetic circuit having a magnetic gap at a predetermined location, a conductor film extending between the lower and the upper magnetic films and forming a coil having a predetermined number of turns which intersect the magnetic circuit, and an insulating layer or member for electrically mutually insulating the individual turns of the conductor coil or film and insulating the conductor film, the lower magnetic film and the upper magnetic film from one another. The laminated structure is of course realized on a substrate through a series of thin film processings, which substrate may be partially or wholly made of a magnetic material so that it may also serve as the lower or underlying magnetic member.

The read-out or output characteristic as well as the electromagnetic transducing characteristic of the thin film magnetic head mentioned above has a large dependency on the magnetic characteristics of the magnetic film. Since the thin film magnetic head is used in a high frequency region, it is required that the magnetic film should exhibit high permeability under the high frequency region in concern. To meet with this requirement, the magnetic film has to be imparted with such uniaxial magnetic anisotropy that the axis of easy magnetization of the magnetic film extends in the direction widthwise of the record track traced by the thin film magnetic head, wherein magnetic excitation is effected in the direction corresponding to the axis of hard magnetization in view of the fact that magnetization reversal is then realized by rotation of magnetization at a significantly higher speed as compared with the magnetization reversal realized by domain wall motion which is brought about when the magnetic excitation is effected in the direction corresponding to the easy axis.

On the other hand, one of the requirements imposed on the thin film magnetic head is to reduce or nullify the instability of the electromagnetic transducing characteristic which is considered to be ascribable to the fact that difference in dimension of the magnetic films is insignificant when compared with the size of the magnetic domain and that the magnetic head is used in the high frequency region on the order of MHz or more and which presents no problem in the conventional bulk magnetic head. In efforts to solve this problem, there have heretofore been proposed various measures.

It is proposed as one of the approaches for solving the aforementioned problem to use the magnetic film which exhibits a negative magnetostriction constant on the grounds that the axis of hard magnetization can then extend perpendicularly to the direction widthwise of the recording track traced by the magnetic head because of the tensile stress acting on the magnetic film in the direction perpendicular to the direction widthwise of the track and that the magnetic switchings of the major magnetic domains take place progressively under smooth rotation of magnetization. However, experiments performed by the inventors have shown that there are produced in the upper magnetic film such tensile stresses which act in the direction widthwise of the recording track and compressive stresses which act in the direction perpendicular to the direction widthwise of the recording track in addition to the tensile stresses acting in the direction perpendicular to the direction widthwise of the track, and that the negative magnetostriction constant of a large value is undesirably accompanied with decrease in the permeability of the magnetic film. It has thus been established that the thin film magnetic head enjoying the stable electromagnetic transducing characteristic can not be attained merely by imparting the negative magnetostriction to the magnetic film.

As another approach, it is also known to make the composition of the magnetic film uniform. Since the magnetostriction of the magnetic film is mainly determined by the composition thereof, the uniform composition will bring about the correspondingly uniformed magnetostriction which in turn will be able to make the electromagnetic transduction characteristic more stable when compared with the magnetic head in which the magnetostriction of the upper magnetic film is not uniform. However, since the electromagnetic transducing characteristic undergoes influences of other various factors mentioned hereinbefore in addition to the magnetostriction, it is impossible to assure sufficient stability for the electromagnetic transducing characteristic by merely making the composition uniform and hence the magnetostriction of the magnetic film.

SUMMARY OF THE INVENTION

An object of the present invention is to provide an improved thin film magnetic head which is immune to the difficulties of the prior art thin film magnetic heads.

It is another object of the present invention to provide a thin film magnetic head which is suited for increasing the recording density on a magnetic drum, magnetic tape or a magnetic disc.

It is a further object of the present invention to provide a thin film magnetic head which is much stabilized in respect of the electromagnetic transduction characteristic and capable of producing a read output of a high level.

In view of the above objects, the present invention provides according to an aspect of the invention that at least the upper or overlying magnetic film is imparted with the magnetostriction constant which is not greater than $6 \times 10^{-7}$ in the absolute value. With the magnetostriction constant of magnitude defined above, it is possible to nullify or reduce the rate of change of the read-out voltage to a possible minimum, with the read-out power level being significantly increased.

Other objects, features and advantages of the present invention will be more apparent from the following description of the preferred embodiments. The description makes reference to the accompanying drawings.

DESCRIPTION OF THE PREFERRED EMBODIMENTS

Figure 1:
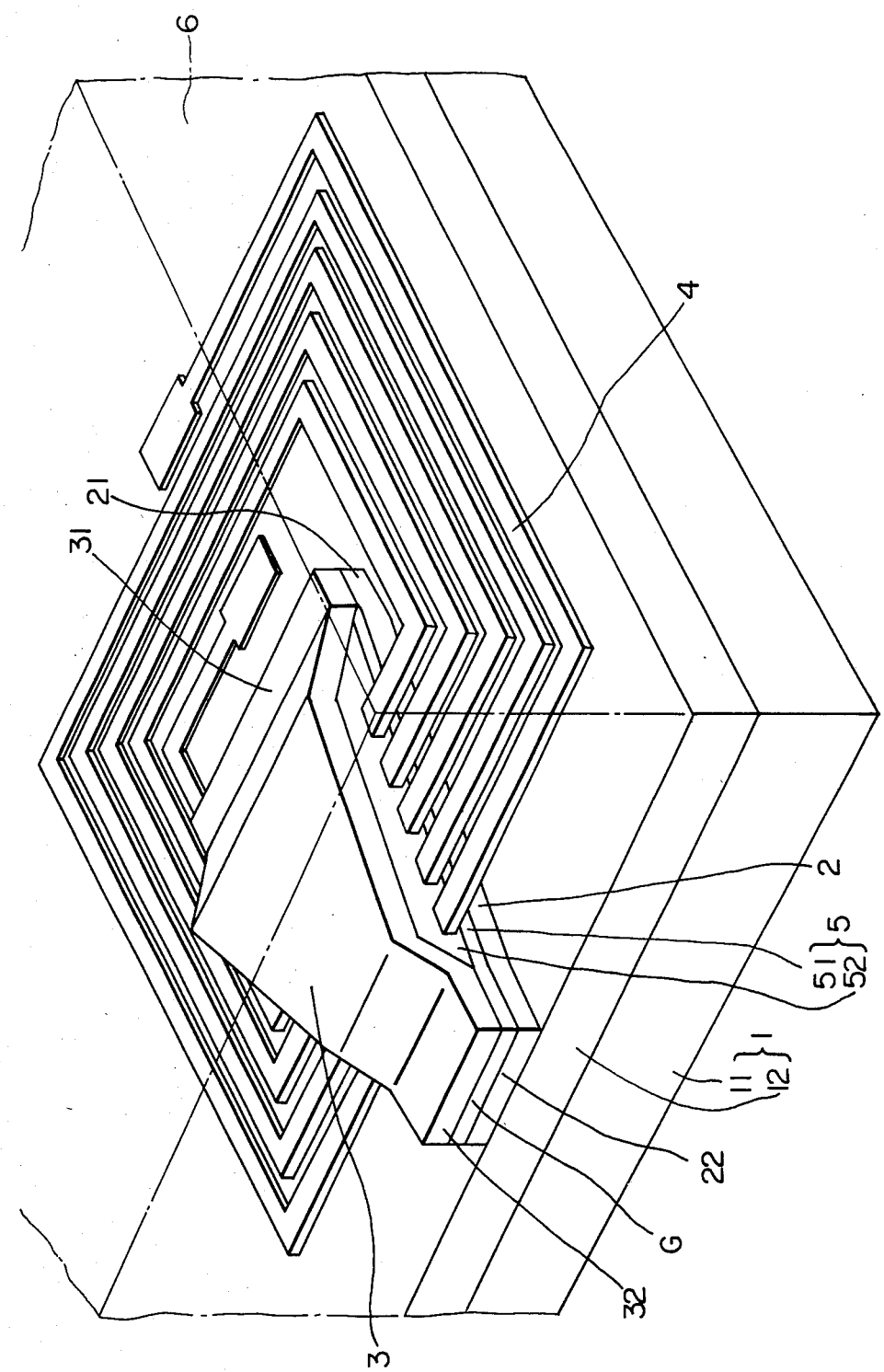
FIG. 1 shows in a schematic perspective view a thin film magnetic head according to an embodiment of the invention.

In the following, the present invention will be described in conjunction with exemplary embodiments thereof by referring to the drawings.

In FIG. 1, a reference numeral 1 denotes a substrate which is constituted by a base plate 11 made of, for example, a ceramic of $Al_2O_3$-TiC series and an $Al_2O_3$-film 12 deposited on a major surface of the ceramic plate 11 for reducing the roughness of that surface. Reference numeral 2 denotes a lower or underlying magnetic film formed in a predetermined configuration on the $Al_2O_3$-film 12 of the substrate 1, and a numeral 3 denotes an upper or overlying magnetic film formed over the lower magnetic film 2 and having one end portion 31 contacted to the lower magnetic film 2 at one end portion 21 thereof, while the other end portion 32 of the upper magnetic film 3 is disposed in opposition to the other end portion 22 of the lower magnetic film 2 with a magnetic gap G being defined therebetween. The lower and the upper magnetic films 2 and 3 thus cooperate together to constitute a magnetic circuit provided with the magnetic gap G. It should be understood that the magnetostriction constant of the upper magnetic film 3 is not greater than $6 \times 10^{-7}$ in the absolute value. Reference numeral 4 denotes a conductor film which forms a conductor coil having a predetermined number of turns and extending between the lower magnetic film 2 and the upper magnetic film 3 so as to intersect the magnetic circuit constituted by both the magnetic films 2 and 3. Reference numeral 5 denotes an insulation member or layer which serves to fill the inter-turn spaces between the individual turns of the conductor coil 4 and electrically insulate the lower magnetic film 2, the upper magnetic film 3 and the conductor film 4 from one another. The insulation layer 5 is composed of a first sub-layer 51 which is formed of an inorganic insulation material and interposed between the conductor film 4 and the lower magnetic film 2 so as to extend to the magnetic gap G and a second sub-layer 52 which is formed of an organic insulation material and fills inter-turn spaces of the conductor film or coil 4, while being interposed between the conductor coil or film 4 and the upper magnetic film 3 and, if needed, between the conductor film 4 and the first sub-layer 57. Finally, reference numeral 6 denotes a protection member or layer formed of an organic or inorganic material.

With the structure of the thin film magnetic head described above, stabilization of the desired electromagnetic transduction characteristic as well as improvement of the output performance or level of the magnetic head can be attained, the reason for which will be elucidated below.

In general, the instability in the electromagnetic transduction characteristic of a thin film magnetic head originates in the instability in the permeability of the magnetic film which in turn is ascribable to the instability of the structure of magnetic domains. The magnetic domain structure of a magnetic film is so determined that the sum of induced uniaxial magnetic anisotropic energy, magnetostatic energy and magnetoelastic energy may become as small as possible. In this connection, it is known that the magnetoelastic effect plays a major role in giving rise to the instability of the structure of the magnetic domain. In order to have the magnetoelastic effect understood, types and directions of various stresses acting on the magnetic film have to be brought to light.

Figure 2:
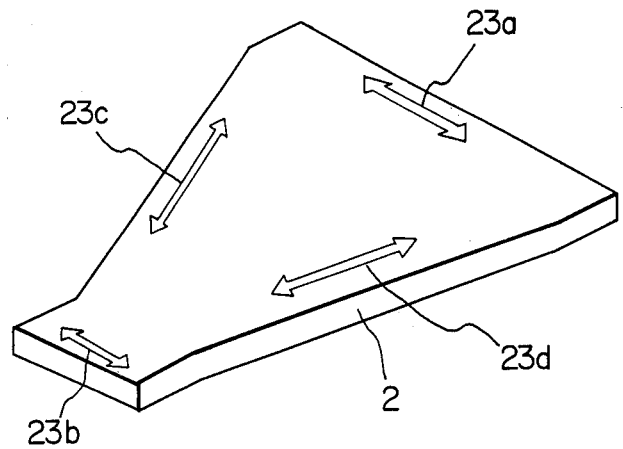
FIG. 2 is a perspective view of a lower magnetic film of the thin film magnetic head to illustrate stresses acting on the film.

FIG. 2 illustrates stresses acting on the aforementioned lower or underlying magnetic film 2, which stresses are produced upon patterning a magnetic film of a large area with a predetermined configuration to be imparted to the lower magnetic film. Accordingly, they are tensile stresses produced along the edges of the patterned magnetic film as indicated by blank arrows 23a, 23b, 23c and 23d. On the average, they may be considered as the tensile stresses acting in the direction perpendicular to the direction widthwise of the record track.

Figure 3:
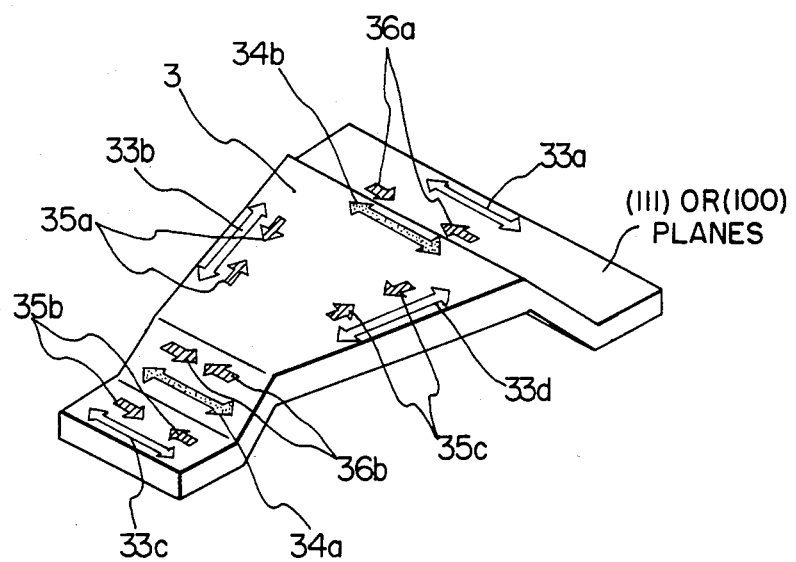
FIG. 3 is a perspective view of an upper magnetic film to illustrate various stresses acting on that film.

FIG. 3 illustrates various stresses acting on the upper or overlying magnetic film 3 mentioned above. It has been experimentally established that the upper magnetic film 3 is subjected to four types of stresses in a much complicated manner as compared with the case of the lower magnetic film 2. The four types of stresses include:

(1) Tensile stresses 33a, 33b, 33c and 33d produced upon patterning of the magnetic film 3 and acting in the direction along the edge portions as is in the case of the lower magnetic film 2.

(2) Tensile stresses indicated by dotted arrows 34a and 34b which are produced upon formation of the upper magnetic film 3 in slope or slanted portions thereof located in the vicinity of the opposite end portions 31 and 32, respectively, and act in the direction widthwise of the recording track.

(3) Compressive stresses indicated by hatched arrows 35a, 35b and 35c which are ascribable to the protection layer 6 (FIG. 1) formed on the upper magnetic film 3 and act along the edges of the magnetic film.

(4) Compressive stresses indicated by arrows 36a and 36b which are produced in the slanted portions at step portion of the magnetic film 3 due to the protection layer or member 6 formed on the upper magnetic film 3 and act in the direction widthwise of the record track.

As will be appreciated, combinations of the tensile stresses ascribable to the patterning and the compressive stresses due to the formation of the protection layer or member 6 act on the upper magnetic film 3 along the edges thereof, while combinations of the tensile stresses ascribable to the formation of the magnetic film itself and the compressive stresses due to the protection member 6 are active in the offset or slanted portions. In the present state of the thin film head fabrication technology, it is practically impossible to reduce these stresses substantially to zero. Under the circumstances, there is inevitably produced the magnetoelastic anisotropy in addition to the inductive uniaxial magnetic anisotropy in the edge portions and the slanted or offset portions of the upper magnetic film whose magnetostriction constant is not zero. In other words, the total anisotropic energy as well as the directions of anisotropies in the edge portions and the slanted portions of the upper magnetic film differs from those appearing in other portions of the upper magnetic film and makes the magnetic domain structure instable. In the light of the above consideration, it is estimated that the instability in the electromagnetic transduction characteristic of the thin film magnetic head rather depends on the absolute magnitude of the magnetostriction constant than the signs (positive or negative) thereof. For this reason, it is necessary to decrease the absolute value of the magnetostriction constant of the magnetic film and inter alia that of the upper or overlying magnetic film, in order to stabilize the electromagnetic transduction characteristic of the thin film magnetic head.

Figure 4:
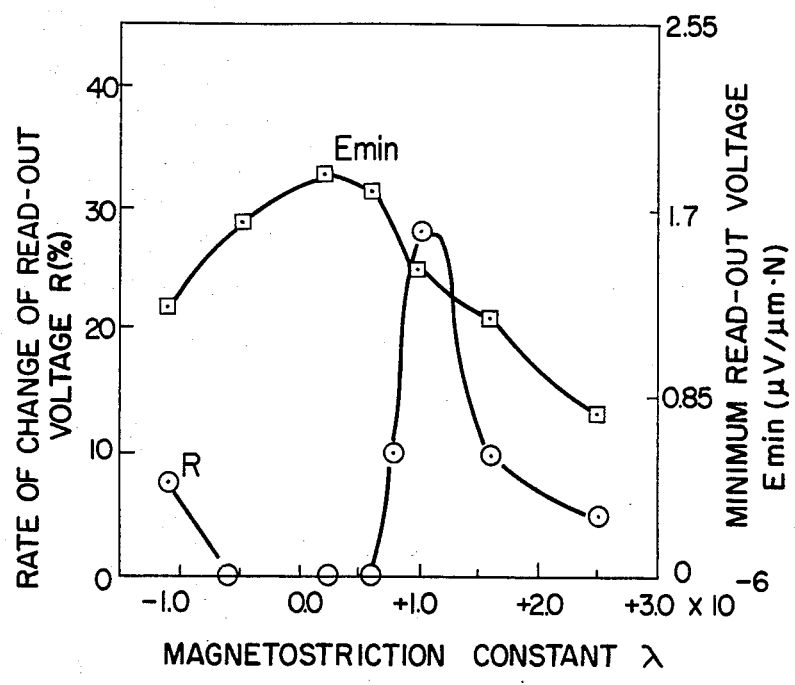
FIG. 4 shows a characteristic diagram for illustrating relationships among the magnetostriction constant of the upper magnetic film, the read-out voltage and the rate of change of the read-out voltage of a thin film magnetic head.

FIG. 4 graphically illustrates the results of measured relationships among the magnetostriction constant, the rate of change in the read-out voltage and magnitude of the read-out voltage standardized for the unit track width and the unit number of the turns of the conductor coil 4. The thin film magnetic heads of the structure shown in FIG. 1 were implemented and employed in the measurements, wherein the upper and the lower magnetic films were both formed of Ni-Fe alloy in thickness of 2 $\mu$m with the magnetic gap length being 0.8 $\mu$m. The magnetostriction constants were determined solely by varying the component ratio or composition of the Ni-Fe alloy. The recording medium as used was formed of coated $\gamma$-Fe$_2$O$_3$ and transported at a speed of 40 m/sec. The space between the recording medium and the thin film magnetic head in the floating state was 0.3 $\mu$m. The rate of change of the read-out voltage (R) is defined as follows:

$$R = (E_{max} - E_{min})/E_{min} \times 100(\%)$$

where $E_{max}$ represents the maximum read-out voltage with $E_{min}$ representing the minimum read-out voltage. The read-out voltage is standardized on the basis of the value of the minimum read-out voltage $E_{min}$ for the unit track width and the unit number of the coil turns, of the conductor film 4. As will be seen from FIG. 4, the rate (R) of change of the read-out voltage is zero so far as the magnetostriction constant is in the range of $+6 \times 10^{-7}$ to $-6 \times 10^{-7}$. In other words, the electromagnetic transduction characteristic of the thin film magnetic head in concern is extremely stable in this range of the magnetostriction constant. It can further be seen that the read-out voltage of great magnitude or high level is obtained in the range of the magnetostriction constant ranging from $+6 \times 10^{-7}$ to $-6 \times 10^{-7}$.

Thus, it is safe to say that the thin film magnetic head which exhibits the stable electromagnetic transduction characteristic and assures the read-out voltage of high level can be obtained by selecting the magnetostriction constant at a value in the range of $+6 \times 10^{-7}$ to $-6 \times 10^{-7}$, i.e. at a value not greater than the absolute value of $6 \times 10^{-7}$. A prerequisite for realization of such preferred thin film magnetic head resides in that the magnetic film having the magnetostriction constant not greater than $6 \times 10^{-7}$ in the absolute value can be industrially fabricated with good reproducibility. Now, description will be made on a method of fabricating the magnetic film of the small magnetostriction constant with satisfactory reproducibility on the assumption, by way of example only, that the thin film is made of an alloy of Ni-Fe series.

Since the alloy of Ni-Fe series assumed to be used in realizing the thin film magnetic head is polycrystalline, the magnetostriction constant of the magnetic film formed of a polycrystalline alloy of Ni-Fe series is determined in dependence of composition and degree of crystal orientation of that alloy. In case of the Ni-Fe alloy in which the (111) planes predominate as the crystal face extending in parallel with the film grown plane, i.e., the upper principal surface of the film in FIG. 3, the magnetostriction constant is zero, provided that the composition of the alloy is 81.1 weight % Ni (i.e. 81% by weight of Ni and the remaining part of Fe). In the case of the alloy film in which the (100) planes predominate as the crystal plane parallel to the grown film plane, the magnetostriction constant is zero, provided that the composition is of 82.6 weight % of Ni. Thus, in order that the absolute value of the magnetostriction constant of the crystalline film having the crystal face (111) orientated to be exposed be smaller than $6 \times 10^{-7}$, inclusive, the corresponding Ni-Fe alloy film should have the composition in the range of 80.7 weight % of Ni to 81.5 weight % of Ni. On the other hand, in order that the absolute value of the magnetostriction constant of the crystalline film orientated to expose the (100) faces be smaller than $6 \times 10^{-7}$, inclusive, the composition of the corresponding Ni-Fe alloy film should lie in the range of 82.2 weight % of Ni to 83.0 weight % of Ni. In this way, in order to realize the Ni-Fe alloy film having the magnetostriction constant not greater than $6 \times 10^{-7}$ in the absolute value with good reproductivity on the industrial base, both the composition and the crystalline orientation of that film have to be strictly controlled. When the Ni-Fe alloy film is formed, for example, through a sputtering process so as to meet the required conditions with regard to the composition and the crystalline orientation, it is necessary to control primarily the composition of the target, temperature of the substrate, attainable degree of vacuum, distance between the target and the substrate, R.F. (radio frequency) power, pressure of argon upon sputtering and a bias voltage applied to the substrate.

Next, a method of manufacturing the thin film magnetic head of the structure shown in FIG. 1 will be described below by way of example.

(1) In the first place, there is prepared the substrate 1 which is constituted by the plate 11 of a ceramic of Al$_2$O$_3$-TiC series and the Al$_2$O$_3$-film 12 formed on one major surface of the ceramic plate 11 by sputtering process.

(2) A film of an alloy of Ni-Fe series is formed over the whole surface of the Al$_2$O$_3$-film 12 of the substrate 1. The alloy film is patterned with a predetermined shape through an ion milling process to constitute the lower magnetic film 2.

(3) An Al$_2$O$_3$-film is formed through a sputtering process over the lower magnetic film 2 and the exposed Al$_2$O$_3$-film of the substrate 1. This Al$_2$O$_3$-film may be left as it is. However, in order to realize the structure shown in FIG. 1, the Al$_2$O$_3$-film is removed through ion milling at the portion at which the lower magnetic film 2 is to be brought into contact with the upper magnetic film, whereby the first sub-layer 51 of the insulation member or layer 5 is formed.

(4) A polyimide resin film is formed over the first sub-layer 51 of the insulation layer 5 except for the area at which the magnetic gap G is to be defined. This resin film should preferably be formed simultaneously on the substrate 1 to protect the conductor film or coil 4 from breakage.

(5) The conductor film 4 is then formed of copper of small specific resistance. In more concrete, a copper film is formed through a sputtering process on the polyimide resin film corresponding to the lower magnetic film 2 and the substrate or the polyimide resin film overlying the substrate and subsequently patterned with a predetermined shape through an ion milling process.

(6) Polyimide resin is applied over the conductor film or coil so as to fill the inter-turn spaces thereof to thereby form the second sub-layer 52 of the insulation layer or member 5. This polyimide resin layer is baked at a predetermined temperature after the application and subsequently subjected to a surface flattening or smoothing treatment through the ion milling process.

(7) The upper magnetic film 3 of Ni-Fe alloy is then formed on the first sub-layer 51 and the second sub-layer 52 corresponding to the lower magnetic film 2 and on the exposed portion of the lower magnetic film through the sputtering process. At this step, control is so made that the temperature of the substrate is set at 250° C., the end vacuum is $2 \times 10^{-6}$ Torr or less, the distance between the target and the substrate is 60 mm, the R.F. power is 1 KW, the pressure of argon upon sputtering is at $2 \times 10^{-3}$ Torr and that the bias potential of the substrate is zero. On these conditions, the alloy film having the composition of 82.6 weight % of Ni and the remaining part of Fe in which only the (100) planes are substantially perfectly orientated in parallel to the film surface is obtained. The magnetostriction constant of this film is in reality zero.

(8) Finally, the protection layer 6 is formed of $Al_2O_3$ exhibiting an excellent thermal conductivity through a sputtering process.

The rate of change of the read-out voltage of the thin film magnetic head realized through the manufacturing steps described above is found substantially null, while the read-out voltage is 1.82 $\mu V/\mu mN$ which approximates to the maximum value.

In the foregoing, the present invention has been described in conjunction with an exemplary embodiment shown in the drawings. However, the invention is not restricted to the disclosed structure of the thin film magnetic head. Numerous variations and modifications will readily occur to those skilled in the art without departing from the sprit and scope cf the invention. Some typical versions will be mentioned below.

(1) A thin film magnetic head in which both the lower magnetic film and the upper magnetic film are imparted with the magnetostriction constant not greater than $6 \times 10^{-7}$ in the absolute value.

(2) A thin film magnetic head in which the substrate is partially or wholly formed of a magnetic material so as to serve also as the lower magnetic film.

(3) A thin film magnetic head in which the conductor film is implemented in multi-layer structure rather than the single layer as shown in FIG. 1.

It will now be appreciated that the present invention has provided a thin film magnetic head which enjoys the stable electromagnetic transduction characteristic and high read-out power level.

We claim:

1. A thin film magnetic head, comprising:
a lower magnetic member having one end portion within the head and another end portion at an end of the head;
a non-magnetic member formed of aluminum oxide and disposed over the other end portion of the lower magnetic member;
an upper magnetic film laminated over said non-magnetic member and said lower magnetic member, said upper magnetic film being a sputtered film formed of a Ni-Fe alloy and having one end portion in contact with the one end portion of said lower magnetic member, another end portion of said upper magnetic film being disposed in opposition to the other end portion of said lower magnetic member with a predetermined magnetic gap being formed therebetween by said non-magnetic member, whereby said upper magnetic film cooperates with said lower magnetic member to constitute a magnetic circuit having said magnetic gap at a predetermined location;
a conductor film for forming a coil having a predetermined number of turns, a portion of said coil extending between said lower magnetic member and said upper magnetic film so as to intersect said magnetic circuit; and
insulation means for electrically mutually insulating the individual turns of said conductor film and for electrically insulating said conductor film said lower magnetic member and said upper magnetic film from one another;
said upper magnetic film having a magnetostriction constant which is not greater than $6 \times 10^{-7}$ in the absolute value; and said Ni-Fe alloy having a composition lying in a range of from 80.7% by weight to 81.5% by weight of Ni, and a principal surface spaced from the lower magnetic member that is mainly formed of (111) planes.

2. A thin film magnetic head, comprising:
a lower magnetic member having one end portion within the head and another end portion at an end of the head;
a non-magnetic member formed of aluminum oxide and disposed over the other end portion of the lower magnetic member;
an upper magnetic film laminated over said non-magnetic member and said lower magnetic member, said upper magnetic film being a sputtered film formed of a Ni-Fe alloy and having one end portion in contact with the one end portion of said lower magnetic member, another end portion of said upper magnetic film being disposed in opposition to the other end portion of said lower magnetic member with a predetermined magnetic gap being formed therebetween by said non-magnetic member, whereby said upper magnetic film cooperates with said lower magnetic member to constitute a magnetic circuit having said magnetic gap at a predetermined location;
a conductor film for forming a coil having a predetermined number of turns, a portion of said coil extending between said lower magnetic member and said upper magnetic film so as to intersect said magnetic circuit; and
insulation means for electrically mutually insulating the individual turns of said conductor film and for electrically insulating said conductor film, said lower magnetic member and said upper magnetic film from one another;
said upper magnetic film having a magnetostriction constant which is not greater than $6 \times 10^{-7}$ in the absolute value; and said Ni-Fe alloy having a composition lying in a range of from 82.2% by weight to 83.0% by weight of Ni, and a principal surface spaced from the lower magnetic member that is mainly formed of (100) planes.

* * * * *